United States Patent [19]
Karni et al.

[11] Patent Number: 5,796,892
[45] Date of Patent: Aug. 18, 1998

[54] DELIVERY OF RADIATION FROM A FIRST TRANSPARENT MEDIUM TO A SECOND TRANSPARENT MEDIUM HAVING A LOWER REFRACTION INDEX

[75] Inventors: Jacob Karni, Rehovot, Israel; Harald Ries, Munich, Germany; Akiba Segal, Rehovot, Israel; Vladimir Krupkin, Rishon Le-Zion, Israel; Amnon Yogev, Rehovot, Israel

[73] Assignee: Yeda Research And Development Co. Ltd., Rehovot, Israel

[21] Appl. No.: 727,458
[22] PCT Filed: Apr. 20, 1995
[86] PCT No.: PCT/US95/04915
  § 371 Date: Oct. 18, 1996
  § 102(e) Date: Oct. 18, 1996
[87] PCT Pub. No.: WO95/29415
  PCT Pub. Date: Nov. 2, 1995

[30] Foreign Application Priority Data

Apr. 21, 1994 [IL] Israel ......................... 109366

[51] Int. Cl.⁶ ..................................... G02B 6/26
[52] U.S. Cl. ..................... 385/38; 385/43; 385/901; 385/146
[58] Field of Search ................. 385/38, 43, 901, 385/146, 31, 36, 39, 48

[56] References Cited

U.S. PATENT DOCUMENTS

| | | | |
|---|---|---|---|
| 4,842,390 | 6/1989 | Scottini et al. | 385/43 |
| 5,075,632 | 12/1991 | Potter | 328/5 |
| 5,151,096 | 9/1992 | Khowry | 606/15 |
| 5,196,005 | 3/1993 | Diron et al. | 606/7 |
| 5,269,777 | 12/1993 | Doiron et al. | 606/7 |
| 5,303,324 | 4/1994 | Lundahl | 385/147 |
| 5,305,401 | 4/1994 | Becker et al. | 385/24 |
| 5,373,571 | 12/1994 | Reid et al. | 385/43 |

FOREIGN PATENT DOCUMENTS 3833991 4/1990 Germany .................. 385/38

Primary Examiner—John Ngo
Attorney, Agent, or Firm—Sprung Kramer Schaefer & Briscoe

[57] ABSTRACT

A method of delivering guided radiation arriving via a first transparent medium having a first refractive index into a second transparent medium having a second refractive index that is smaller than the first refractive index, comprising: providing a transparent radiation delivery waveguide capable of admitting concentrated radiation and having a longitudinal axis and a third refractive index substantially equal to or greater than the first refractive index and adapted to guide the radiation along the longitudinal axis. The waveguide having a tapered radiation delivery portion of non-circular cross-sectional shape. Mounting the waveguide in optical contact with the first transparent medium so that the radiation delivery portion projects inside the second transparent medium.

40 Claims, 2 Drawing Sheets

SECOND VERSION

5,796,892

DELIVERY OF RADIATION FROM A FIRST TRANSPARENT MEDIUM TO A SECOND TRANSPARENT MEDIUM HAVING A LOWER REFRACTION INDEX

FIELD OF THE INVENTION

The invention relates to a waveguide for the transmission of guided radiation from a medium with a high refraction index to a medium with a lower refraction index, in particular to delivery of concentrated sunlight into a solar receiver. It may be also used in radio telescopes, fiber optics waveguides, etc.

BACKGROUND OF THE INVENTION

The concentration of radiation, for example in the context of solar energy utilization, is limited by the conservation of space law (W. T. Welford and R. Winston *High Collection Non-Imaging Optics* Chapter 3, Academic Press, New York, 1989). Thus rotationally symmetric optical systems can achieve a maximum concentration ratio of $$C_{max} = \frac{n^2}{\sin^2(\theta)} \quad (1)$$

where $\theta$ is the maximum angle to the optical axis subtended by the incoming radiation and n is the index of refraction of the medium. In a high index transparent material such as glass or fused silica (n≈1.45) the maximum concentration is therefore roughly twice as high as in air (n≈1). However, if finally this radiation is to be extracted into air, this advantage is lost due to total internal reflection at the interface. Total internal reflection, on the other hand, can be used to guide part of this maximally concentrated radiation in a waveguide. If however, the light guide is terminated simply by a cut perpendicular to the axis, again part of the radiation undergoes total internal reflection and is lost. There thus exists a problem to extract the light from the light guide, without increasing its diameter, in such a manner that losses are minimized. The diameter should not be increased in order to be able to use the light guide to deliver radiation into a cavity receiver of given aperture.

When radiation is delivered from a source to the receiver, it is often desirable, especially in the field of solar energy, to provide on the receiver an as high as possible power density so as to maximize the efficiency of energy transfer from or energy conversion by the receiver. It is, therefore, advantageous to use a relatively small receiver chamber with a relatively small aperture, in association with suitable optical concentration systems and waveguides for transferring the concentrated radiation from a source to a receiver.

It is accordingly the object of the present invention to provide an improved wave guiding method and means for the effective extraction of radiation from a transparent delivery medium with a high index of refraction into a receiving medium with a lower index of refraction.

SUMMARY OF THE INVENTION

In the following description and claims the term "guided radiation" means a radiation propagating in a controllable fashion. The term "receiver chamber" is used to designate a chamber into which concentrated radiation is delivered by extraction from a waveguide regardless of the manner in which the extracted radiation behaves inside the chamber. The term "transparent" means that a given medium transmits the radiation under consideration.

In accordance with the invention there is provided a method of delivering guided radiation arriving via a first transparent medium having a first refraction index $n_1$, into a second transparent medium having a second refraction index $n_2$ that is smaller than $n_1$, comprising providing a transparent radiation delivery waveguide having a longitudinal axis and a third refraction index $n_3$ substantially equal to or greater than $n_1$ and adapted to guide said radiation along said longitudinal axis, said waveguide having a tapered radiation delivery portion of non-circular cross-sectional shape, mounting said waveguide in optical contact with said first transparent medium and so that said radiation delivery portion projects inside said second transparent medium, and causing said first transparent medium to take up radiation whereby radiation transmitted by the waveguide is extracted therefrom through the radiation delivery portion into the second transparent medium.

The guided radiation delivered in accordance with the invention from a first into a second transparent medium may be any kind of electro-magnetic radiation such as light or radio waves. In particular, it may be a concentrated light from any artificial source, or concentrated solar radiation.

The invention further provides for use in the performance of the above method, a radiation delivery waveguide having a tapered radiation delivery portion of non-circular cross-sectional shape and made up of a medium with an index of refraction higher than the index of refraction of a medium surrounding said delivery portion.

Still further, the invention provides a guided radiation receiver assembly comprising a first transparent medium with a first refraction index $n_1$, a receiver chamber having an aperture and holding a second transparent medium having a second refraction index $n_2$, and a transparent radiation delivery waveguide having a third refraction index $n_3$ substantially equal to or greater than $n_1$, which transparent radiation delivery waveguide has a first, radiation intake portion in optical contact with said first transparent medium and held tightly within said aperture, and a second tapered radiation delivery portion of non-circular cross-sectional shape projecting into the receiver chamber.

If desired, the degree of tapering of the radiation delivery portion may vary along the axis. Also if desired, the first transparent medium and delivery waveguide may be made integral with each other.

Many non-circular cross-sectional shapes of the tapered radiation delivery portion are conceivable such as, for example, elliptic or grooved. In a preferred embodiment, the radiation delivery portion is polyhedral. If desired, the cross-sectional shape of a polyhedral tapered delivery portion may vary along the axis, e.g. from a first to a second polyhedral shape.

The above preferred embodiment of the invention in which the tapered delivery portion is polyhedral, is based on the surprising finding made in accordance with the invention that the radiation extraction efficiency from a tapered polyhedron is particularly high.

As the refraction index of the radiation delivery waveguide according to the present invention is higher than that of the second transparent medium in the receiver chamber surrounding the delivery portion, the transmitted radiation is liable to undergo total internal reflection at the inner surface of the delivery portion if the angle of incidence on the surface is equal to or greater than a critical angle. However, due to the specific design of the radiation delivery waveguide of the invention and the manner in which it is mounted in the aperture of a receiver chamber of a radiation receiver assembly, total and Fresnel reflections of the transmitted radiation at the waveguide/second transparent medium boundary inside the receiver chamber is minimized and extraction of the delivered radiation is maximized.

In case of a cylindrical delivery waveguide the angle at which rays propagating inside the waveguide incident the inner surface thereof will remain unchanged regardless of the number of total reflections. Consequently, in such a waveguide only rays whose angle of incidence is a priori smaller than the critical angle will leak outside the waveguide while any ray whose angle of incidence is a priori equal to or larger than the critical angle will be rejected. This phenomenon is known as the conservation of skewness law (see W. T. Welford and R. Winston, loc. cit.). In accordance with the present invention the constraints of the conservation of skewness law are overcome due to the gradually diminishing cross-sectional area of the tapered delivery section by which the rays propagation is randomized and rays that were apriori totally reflected inside the intake section leak out of the tapered delivery section because of the continuous change of the angle of incidence on the internal surface.

In a preferred embodiment of the invention the light density inside the radiation delivery waveguide is kept constant and a constant high extracted power density is provided by gradually decreasing the cross-sectional area of the delivery section in a particular fashion so as to correspond to the diminishing power density.

The shape of the waveguide in cylindrical polar co-ordinates may be described by $$R=R(\phi,z) \quad (2)$$

where R is a cross-sectional linear dimension, $\phi$ is the polar angle around the optical axis and z is the distance along the axis. Randomization will occur when $$\frac{\partial R}{\partial \phi} \neq 0 \quad (3)$$

However, in order to ensure that a given ray will after some reflection reach an angle at which it leaks before reaching an angle at which it would be rejected, the gradual tapering should preferably obey the expression $$\frac{\partial R}{\partial \phi} \sim 0 \quad (4)$$

where R and $\phi$ are as before.

From expressions (3) and (4) it is concluded that the desirable slope of the tapered delivery section should be defined by $$-1 < \frac{\partial R}{\partial \phi} < 0 \quad (5)$$

Concave shaping of any of the polygon surfaces in the delivery section of the waveguide should preferably be avoided because in a concave surface some extracted rays may re-enter and be rejected.

BRIEF DESCRIPTION OF THE DRAWINGS

For better understanding the invention will now be described, by way of example only, with reference to the annexed drawings in which.

DESCRIPTION OF THE PREFERRED EMBODIMENTS

Figure 1:
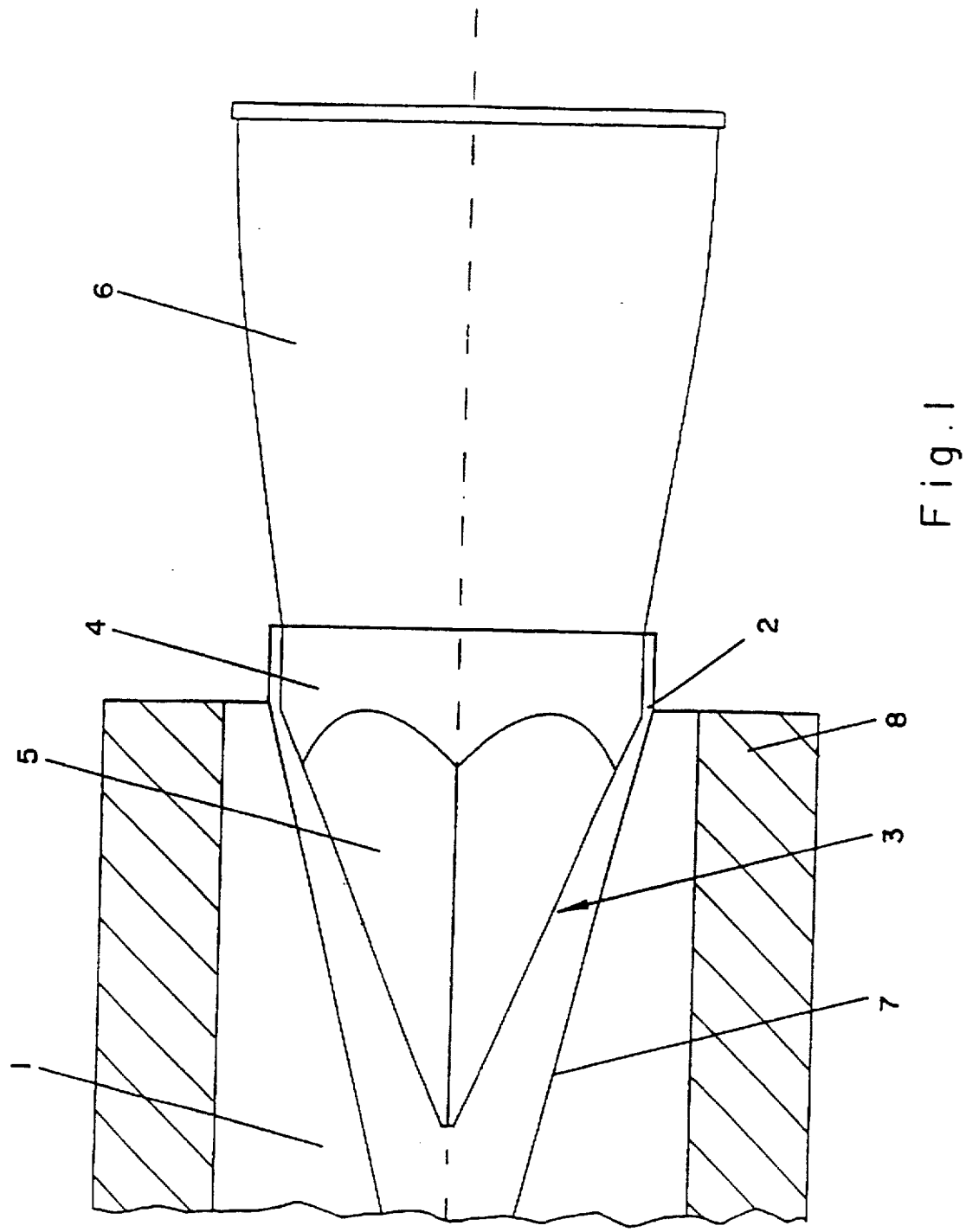
FIG. 1 radiation receiving assembly according to the invention.

Turning first to FIG. 1, there is shown an assembly for receiving a concentrated radiation, comprising a receiver chamber 1 with a circular aperture 2 holding a transparent radiation delivery waveguide 3 having a first, cylindrical intake section 4 and a second, tapered hexagonal radiation delivery section 5. Intake section 4 fits snugly into aperture 2 and is integral with a tubular concentrator 6. The walls 7 of receiver chamber 1 are transparent and they are surrounded by a solar absorber body 8. The waveguide 3 and concentrator 6 are made of fused silica (n=1.46) while the medium inside the receiver chamber 1 and around concentrator 6 is air (n=1). If desired, waveguide 3 may be made of a material different from and having a higher refraction index than concentrator 6. Also if desired, waveguide 3 and concentrator 6 may be two distinct bodies.

As shown, the tapered hexagonal radiation delivery section 5 of waveguide 3 penetrates into the receiver chamber 1 and the mounting is such that the cylindrical intake section 4 is held snugly in the receiver chamber aperture 2. The cylindrical intake section 4 is adapted to transfer the light from the concentrator 6 across the receiver aperture 2 with practically no leakage to the surrounding aperture.

As shown, in the tapered hexagonal radiation delivery section 5 of waveguide 3 there is a gradual transition from the circular shape of the intake section 4 to the hexagonal shape of the tapered extractor section 5. The gradual decrease of the cross-sectional area in the tapered extractor section 5 should preferably obey formula (5) above. For the hexagonal shape the ratio $$\frac{\partial R}{\partial \phi}$$

has the value of −0.5. The angle of convergence of the tapered delivery section 5 may vary whereby the rate of reduction of the cross-sectional area in the axial direction is varied.

The ratio of the length of the tapered radiation delivery section 5 to its maximum diameter near the intake section 4 should not be more than necessary and depends, i.a., on the angle of incidence of the radiation on the inner surface of the tapered radiation delivery section, typical values being within the range of from 1:1 to 5:1.

Quite generally, the ratio between the area of the outer surface of the waveguide and its cross-sectional area is derived from the law of conservation of space (see W. T. Welford and R. Winston, loc. Cit.), from which it follows that the space available for the extracted radiation must be sufficient to accommodate the phase space it occupied in the waveguide. The phase space $E_i$ occupied by the radiation propagating in the waveguide is $$E_i = n^2 \pi A_o \eta_p \quad (6)$$

where $A_o$ is the area of a perpendicular cross-section normal to the axis, n is the index of refraction inside the waveguide, and $\eta_p$ is the fraction of radiation that can be guided by such a waveguide when surrounded by air and is described by $$\eta_p = 1 - \frac{1}{n^2} \quad (7)$$

The external phase space available is $$E_e = \pi A_e \quad (8)$$

where $A_e$ is the area through which the radiation is extracted. From the conservation of space a lower limit for the extraction area may thus be derived:

$$A_e > \eta_p n^2 A_o \quad (9)$$

While the above equations apply strictly to a cylindrically symmetric waveguide, for waveguides with a tapered delivery portion according to the invention the conservation of space law referred to above is only statistically correct.

Figure 2:
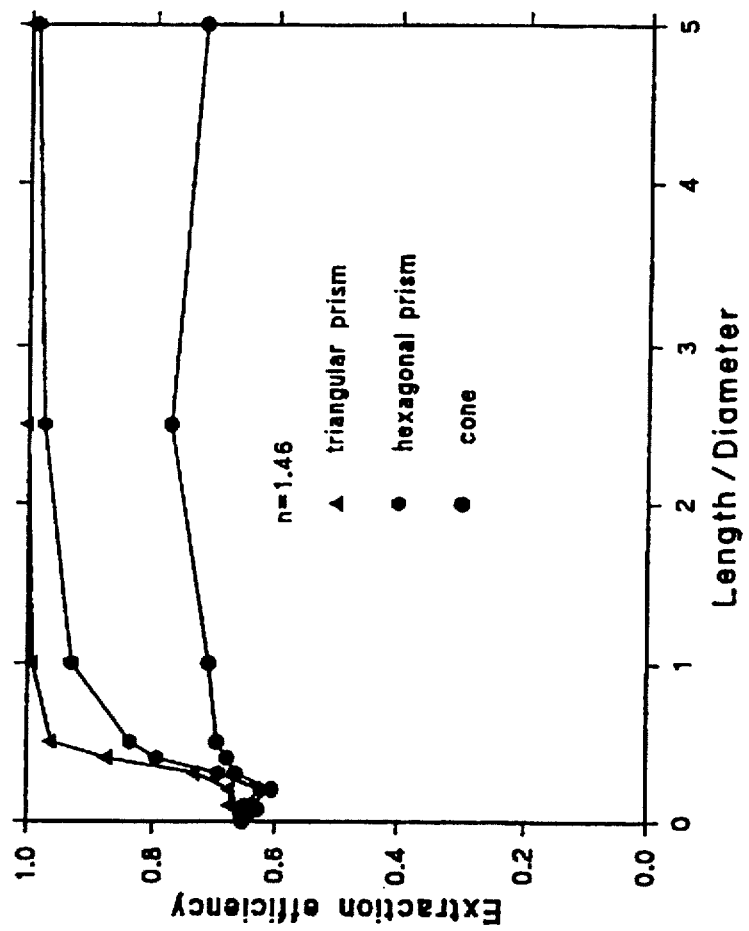
FIG. 2 is a graphical representation of a ray tracing simulation of the extraction as a function of length of the waveguide.

In an investigation of the shape of the tapered delivery section 5 of the waveguide 3, a hexahedral tapered prism was compared with (i) a regular trihedral tapered prism and (ii) with a circular cone. The investigation was conducted by ray trace simulation in which $10^4$ rays were traced on a rectangular four-dimensional grid in phase space and the results, in terms of ray extraction as a function of the length of the extractor section, are shown in FIG. 2. The initial angle of incidence on the inner surface is assumed to be 90° and the waveguide is assumed be uniformly filled with all the radiation it can conduct. At zero length of the tapered section, that is when the waveguide is cut normal to its axis, the fraction of extracted light is 65%, which corresponds to the maximum concentration in air, while for a one diameter length or more of the tapered delivery section 5, practically all radiation is extracted from the trihedral prism. The hexahedral prism as well provides a close to 100% extraction efficiency, albeit only at a length exceeding 5 diameters. In contrast, the circular cone's maximum extraction efficiency is about 72%.

Although the trihedral shape of the tapered section of the waveguide appeared to be very efficient, it is not well suited for association with a circular intake section for which a polyhedral shape with more than three sides is preferable in that it provides on the one hand the required departure of the slope from cylindrical symmetry while at the same time providing adequate transition to a circular intake section which is required in all those cases in which the aperture of the receiver chamber is circular. It should be mentioned that, in general, the tapered section of the waveguide may have other non-circular cross-sections, e.g. elliptic or grooved. It may even be of a basically circular configuration in which the cross-sectional shape at any point along the axis is serrated.

Thus, out of radiation propagating from the concentrator 6 along the waveguide 3, those rays that form a large angle with the axis will be extracted first from the large diameter part of the waveguide. The rays forming an initial small angle with the axis will be totally reflected from the inner surface of the waveguide, sometimes repeatedly. However, as the side walls of the tapered section converge, an initially reflected ray gradually increases its angle with the axis until the angle becomes sufficiently large for the ray to cross the side wall and thus be extracted.

If the decrease in cross-section is monotonic and sufficiently slow, then the described process may be regarded as being quasi-adiabatic. This means that at each point along the axis all rays that can be extracted will be extracted. Therefore, the flux density is constant along the axis. This opens up the possibility of controlling the rate of extraction by controlling the rate of reduction of the cross-section. Thus, for constant convergence as in the case of a prism, the rate of radiation extraction is proportional to the perimeter. Viewed by a distant observer, the average brightness of the prism is constant. In general, it is proportional to the tangent of the slope angle.

Thus, the present invention enables to provide a waveguide of a required size, in which power density may be kept constant and the extracted power density outside may be controlled and even reach a value close to the thermodynamic limit.

In a particular embodiment of the invention the radiation receiver assembly is part of a solar energy plant and the receiver chamber either holds directly an energy conversion device such as a solar radiation absorber, a light/electricity transducer, a chemical reactor and the like; or else is made of transparent walls with any such energy conversion devices on the outside. However, it should be noted that the present invention may be used quite generally in cases where it is required to extract radiation from a transparent element made of a material with a high refraction index, into a transparent element having a lower index of refraction, and where the controllable, particularly high, power density is required.

We claim:

1. A method of delivering guided radiation arriving via a first transparent medium having a first refraction index $n_1$ into a second transparent medium having a second refraction index $n_2$ that is smaller than $n_1$, comprising providing a transparent radiation delivery waveguide having a longitudinal axis and a third refraction index $n_3$ substantially equal to or greater than $n_1$ and adapted to guide said radiation along said longitudinal axis, said waveguide having a tapered radiation delivery portion of non-circular cross-sectional shape, mounting said waveguide in optical contact with said first transparent medium and so that said radiation delivery portion projects inside said second transparent medium, and causing said first transparent medium to take up radiation whereby radiation transmitted by the waveguide is extracted through the radiation delivery portion into said second transparent medium.

2. A method according to claim 1, wherein said tapered radiation delivery portion is polyhedral.

3. A method according to claim 2, wherein the polyhedral shape of said tapered radiation delivery portion varies along said axis.

4. A method according to claim 1, wherein said tapered radiation delivery portion is of grooved shape.

5. A method according to any one of claims 1 to 4, wherein the degree of tapering of the radiation delivery portion varies along the axis.

6. A method according to claim 1, wherein said first transparent medium is a light concentrator.

7. A method according to claim 1, wherein said first transparent medium is a non-concentrating waveguide.

8. A method according to claim 6, wherein said first transparent medium and said transparent delivery waveguide are made integral with each other.

9. A method according to claim 1, wherein said guided radiation is solar radiation.

10. A method according to claim 1, where said guided radiation is concentrated radiation from an artificial source.

11. A method according to claim 1, where said second transparent medium is held within a receiver chamber having an aperture.

12. A method according to claim 11, where said transparent delivery waveguide has a radiation intake portion designed to fit into the aperture of said receiver chamber.

13. A radiation delivery waveguide having a tapered radiation delivery portion having a longitudinal axis and a non-circular cross-sectional shape normal thereto and made up of a medium with an index of refraction higher than an index of refraction of medium surrounding said radiation delivery portion.

14. A radiation delivery waveguide according to claim 13, wherein said tapered radiation delivery portion is polyhedral.

15. A radiation delivery waveguide according to claim 14, wherein the polyhedral shape of said tapered radiation delivery portion varies along a longitudinal axis of the waveguide.

16. A radiation delivery waveguide according to claim 13, wherein said tapered radiation delivery portion is of grooved shape.

17. A radiation delivery waveguide according to any one of claims 13 to 16, wherein the degree of tapering of the radiation delivery portion varies along the axis.

18. A guided radiation receiver assembly comprising a first transparent medium with a first refraction index $n_1$, a receiver chamber having an aperture and holding a second transparent medium having a second refraction index $n_2$, and a transparent radiation delivery waveguide having a third refraction index $n_3$ substantially equal to or greater than $n_1$, which transparent radiation delivery waveguide has a first, radiation intake portion in optical contact with said first transparent medium and held tightly within said aperture, and a second tapered radiation delivery portion of non-circular cross-sectional shape, projecting into the receiver chamber.

19. An assembly according to claim 18, wherein said tapered radiation delivery portion is polyhedral.

20. An assembly according to claim 19, wherein the polyhedral shape of said tapered radiation delivery portion varies along the central axis.

21. An assembly according to claim 18, wherein said tapered radiation delivery portion is of grooved shape.

22. An assembly according to claim 18, wherein the degree of tapering of the radiation delivery portion varies along the axis.

23. An assembly according to claim 18, wherein said first transparent medium is a light concentrator.

24. An assembly according to claim 18, wherein said first transparent medium is a non-concentrating waveguide.

25. An assembly according to claim 18, wherein said first transparent medium and said transparent delivery waveguide are made integral with each other.

26. An assembly according to claim 18, adapted for the delivery of concentrated solar radiation.

27. An assembly according to claim 18, adapted for the delivery of concentrated artificial radiation.

28. A method of delivering guided radiation arriving via a first transparent medium having a first refraction index $n_1$, into a second transparent medium having a second refraction index $n_2$ that is smaller than $n_1$, comprising providing a transparent radiation delivery waveguide capable of admitting concentrated radiation and having a longitudinal axis and a third refraction index $n_3$ substantially equal to or greater than $n_1$ and adapted to guide said radiation along said longitudinal axis, said waveguide having a tapered radiation delivery portion of non-circular cross-sectional shape, mounting said waveguide in optical contact with said first transparent medium and so that said radiation delivery portion projects inside said second transparent medium, and causing said first transparent medium to take up radiation whereby radiation transmitted by the waveguide is extracted through the radiation delivery portion into said second transparent medium.

29. A method according to claim 28, wherein said first transparent medium is a light concentrator.

30. A method according to claim 28, wherein said guided radiation is solar radiation.

31. A method according to claim 30, wherein said guided radiation is concentrated radiation from an artificial source.

32. A radiation delivery waveguide adapted to admit concentrated radiation and having a longitudinal axis and a tapered radiation delivery portion of non-circular cross-sectional shape normal to said axis, and made up of a medium with an index of refraction higher than an index of refraction of medium surrounding said radiation delivery portion.

33. A radiation delivery waveguide according to claim 32, wherein said tapered radiation delivery portion is polyhedral.

34. A radiation delivery waveguide according to claim 33, wherein the shape of said tapered radiation delivery portion varies along a longitudinal axis of the waveguide.

35. A radiation delivery waveguide according to claim 32, wherein said tapered radiation delivery portion is of grooved-circular shape.

36. A radiation delivery waveguide according to claim 32, wherein the degree of tapering of the radiation delivery portion varies along the axis.

37. A guided radiation receiver assembly comprising a first transparent medium with a first refraction index $n_1$, a receiver chamber having an aperture and holding a second transparent medium having a second refraction index $n_2$, and a transparent radiation delivery having a third refraction index $n_3$ substantially equal to or greater than $n_1$, which transparent radiation delivery having a third refraction index $n_3$ substantially equal to or greater than $n_1$, which transparent radiation delivery waveguide is adapted to admit concentrated radiation and has a first, radiation intake portion in optical contact with said first transparent medium and held tightly within said aperture, and a second tapered radiation delivery portion of non-circular cross-sectional shape, projecting into the receiver chamber.

38. An assembly according to claim 37, wherein said first transparent medium is a light concentrator.

39. An assembly according to claim 37, wherein adapted for the delivery of concentrated solar radiation.

40. An assembly according to claim 37, adapted for the delivery of concentrated artificial radiation.

* * * * *